United States Patent [19]
Hashimoto

[11] Patent Number: 5,873,770
[45] Date of Patent: Feb. 23, 1999

[54] VIBRATORY FINISHING PROCESS

[75] Inventor: Fukuo Hashimoto, North Canton, Ohio

[73] Assignee: The Timken Company, Canton, Ohio

[21] Appl. No.: 681,013

[22] Filed: Jul. 22, 1996

[51] Int. Cl.[6] ............................................. B24B 1/04
[52] U.S. Cl. ............................. 451/32; 451/34; 451/35;
451/113; 451/326
[58] Field of Search .................................. 451/32, 34, 35,
451/104, 106, 113, 326, 327, 328, 329

[56] References Cited

U.S. PATENT DOCUMENTS

| | | | |
|---|---|---|---|
| 3,897,658 | 8/1975 | Kobayashi | 451/327 |
| 3,935,680 | 2/1976 | Kobayashi | 451/327 |
| 3,979,858 | 9/1976 | Semones et al. | 451/35 |
| 4,818,333 | 4/1989 | Michaud | 451/35 |
| 5,158,629 | 10/1992 | Zobbi | 451/35 |
| 5,187,899 | 2/1993 | Rhoades | 451/165 |
| 5,503,481 | 4/1996 | Hashimoto et al. | |
| 5,507,684 | 4/1996 | Hoffman | 451/34 |

OTHER PUBLICATIONS

A.P. Babichev, V.I. D'Yachenko, *The Vibratory Polishing of Turbine Blades*, Machine & Tooling, 1964;35:41–44.

R.G. Dargis, *Chemical Accelerated–Vibratory Deburring of Steel Parts*, SME, 1984, MR84–943.

L.K. Gillespie, *A Quantitative Approach to Vibratory Deburring Effectiveness*, SME, 1975, MRR75–11.

W.H. Safrenek, A.C. Secrest, and J.C. Turn, *Chemical Accelerators for Vibratory Finishing*, Manufacturing Engineering, Nov. 1976, pp. 32–33.

I. Ohno, *Trend of Development of Centrifugal Barrel Machines for Polishing of Steel Parts*, Kikai Gijyutsu (Japanese), vol. 36–9:47–51.

Primary Examiner—Eileen P. Morgan
Attorney, Agent, or Firm—Polster, Lieder, Woodruff & Lucchesi, L.C.

[57] ABSTRACT

A workpiece has at least one exterior surface with an initial average surface roughness (Ir). The profile of the exterior surface is derived by conventional manufacturing processes, some of which leave the exterior surface with irregularities having directional orientation. The workpiece is subjected to a controlled vibratory finishing process such that the exterior surface has a desired average surface roughness (Ar) after exposure to the finishing process for a predetermine period of time ($T_{opt}$). This predetermined period of time is based upon the initial average surface roughness (Ir), the desired average surface roughness (Ar) and a minimum average surface roughness obtainable through the vibratory finishing process (Dr).

20 Claims, 5 Drawing Sheets

ROUGHNESS CHANGES DURING VIBRATORY FINISHING (EXPERIMENTAL)

As Ground 0.28 um Ra 30 min. 0.06 um Ra

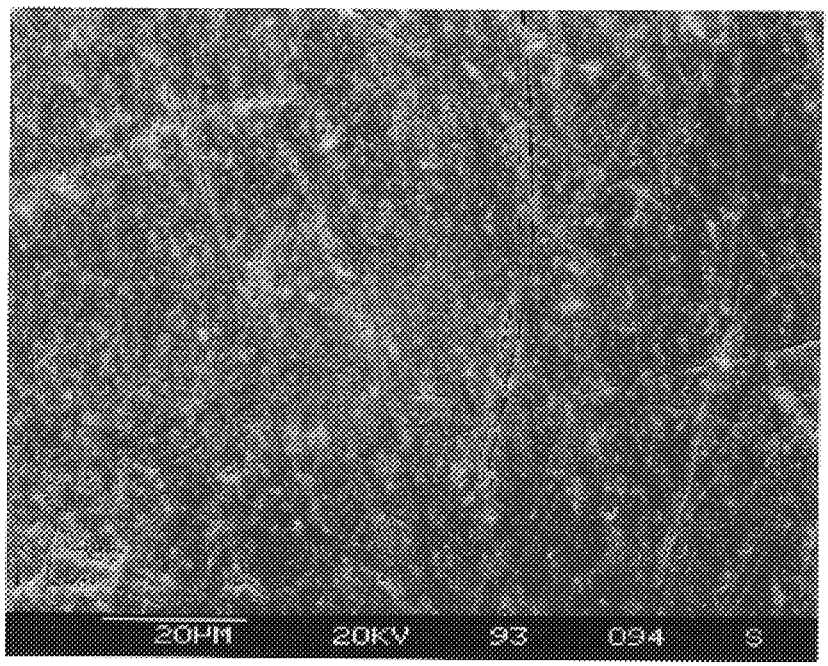
45 min. 0.06 um Ra
FIG. IC
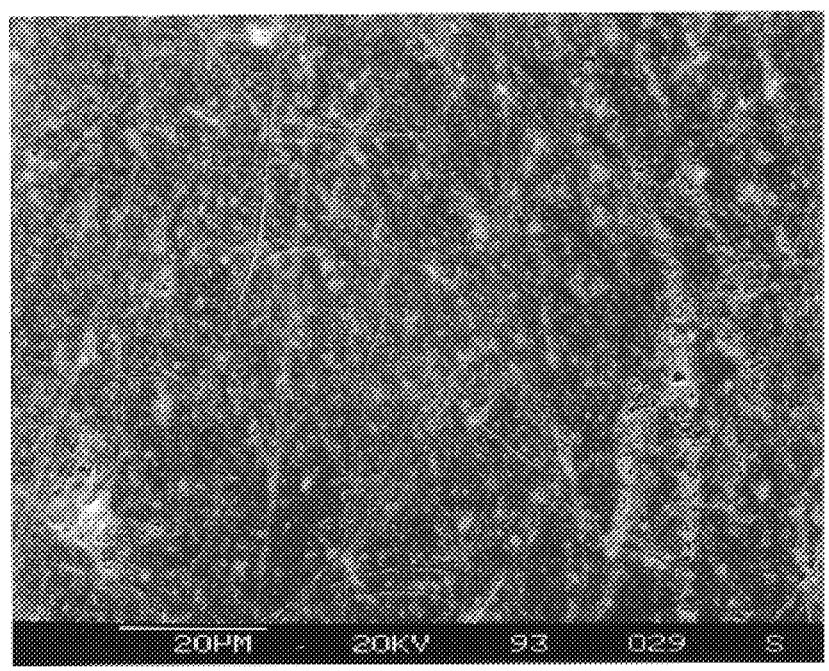
180 min. 0.06 um Ra
FIG. ID

ROUGHNESS CHANGES DURING VIBRATORY FINISHING (EXPERIMENTAL)

STOCK REMOVAL DURING VIBRATORY FINISHING (EXPERIMENTAL)

SIMULATIONS OF ROUGHNESS CHANGES (THEORETICAL)

SIMULATIONS OF STOCK REMOVAL PROCESS (THEORETICAL)

DIAGRAM FOR OPTIMUM PROCESS TIME

VIBRATORY FINISHING PROCESS

BACKGROUND OF THE INVENTION

This invention relates to a process for finishing working surfaces of workpieces, and in particular to a controlled surface vibratory finishing process for providing superior finishes on exterior surfaces of workpieces constructed from many different hard materials such as, for example, steel or ceramic. This invention finds a wide range of application for any workpiece having one or more exterior surfaces. The exterior surfaces can be, for example, working surfaces against which moving components of the device are maintained in contact during operation or use of the device, including machine parts such as antifriction bearings and gears. As will be discussed below, the surface finishing process used in the present invention is any vibratory finishing process, including barrelling, tumbling, rotating, agitating, spinning, shaking or centrifugal processes, where one or more workpieces are placed in a container or similar device with an abrasive medial or abrading elements that displace portions of the workpiece during the vibratory finishing process. The vibratory finishing process can be performed with or without a solution in the container.

As is known in the art, conventional manufacturing processes for workpieces contructed from hard materials such as metals or ceramic generally are classified in one of three categories: (1) processes used primarily to change the shape of materials (e.g., casting, forging, machining, pressing); (2) processes used to finish parts to a desired dimension (e.g., grinding, hobbing, drilling, shaping, milling, torch cutting); and (3) processes used primarily to obtain a desired surface finish (e.g., polishing, honing, superfinishing, painting, lapping, electroplating). The types of processes used to produce a particular product or workpiece are based upon factors such as, for example, volume of production, quality of the finished product, cost, and efficiency. Most workpieces can be produced by several methods, and considerable resources are devoted to developing one manufacturing process that is most economical.

Some products are suitably finished for commercial use after undergoing the first step set forth above in the manufacturing process. However, other products require further processing to obtain the desired dimensions and surface finish. For example, specialty products and machine parts such as bearings or toothed gears are finished to within close tolerances with a final machining on their critical working surfaces (i.e., surfaces against which major components of the machine part are maintained in contact during operation of the device). Certain products and machine parts are subjected to one of the surface finishing processes set forth above to provide an enhanced finish along their working surfaces to enable the parts to operate at lower torques and with less heat generation. Such critical working surfaces initially are finished with a finish grinding or turning, and finally a honing or superfinishing to provide the enhanced finish.

However, the critical surfaces with enhanced finishes may have directional surface textures and surface irregularities which degrade the performance of the parts if the surface finishing process is terminated prematurely or if the selected finishing process is not a preferred production method for that product. Furthermore, the surface finishing process may destroy the profile of the exterior surface of the workpiece is the processing time continues for an extended time period after the desired surface finish is obtained. Since a trial and error approach is used in the prior art to determine the time necessary to obtain the desired surface finish, the third manufacturing process is often time consuming, inefficient and not cost-effective. Nonetheless, such surface finishing processes are necessary and widely used to provide workpieces that perform properly for a given application.

To overcome the undesirable effects associated with enhanced finishing of workpieces, vibratory finishing processes are used in certain situations to finish exterior surfaces. Vibratory finishing processes, including barrelling, tumbling, rotating, agitating, spinning, shaking or centrifugal processes, are used to provide a desired surface roughness on the exterior surfaces. In certain applications, vibratory finishing is used to obtain an isotropic surface. Surface irregularities associated with isotropic surfaces have no orientation, resulting in a superior surface when compared to those receiving enhanced finishes. In other applications, an isotropic surface is not needed or desired, and the vibratory finishing process can be stopped before an isotropic surface is obtained. As discussed in U.S. Pat. No. 5,503,481, issued Apr. 2, 1996 to F. Hashimoto et al. and assigned to The Timken Company, the disclosure of which is incorporated herein by reference, vibratory finishing processes provide superior working surfaces for bearing components. Many advantages of vibratory finishing are reported in the following articles: A. P. Babichev, *The Vibratory Polishing of Turbine Blades*, Machine & Tooling, 1964, 35: 41–44; R. G. Dargis, *Chemical Accelerated-Vibratory Deburring of Steel Parts*, SME, 1984, MR84-943; L. K. Gillespie, *A Quantitative Approach to Vibratory Deburring Effectiveness*, SME, 1975, MRR75-11; and W. H. Safrenek, A. C. Secrest, and J. C. Turn, *Chemical Accelerators for Vibratory Finishing*, Manufacturing Engineering, November 1976, pp. 32–33.

However, as discussed above with respect to the other surface finishing processes, a trial and error approach is employed in the prior art to determine the processing time for exposure of the workpiece to the vibratory finishing process to achieve the desired surface roughness or an isotropic finish. If the workpiece remains in certain vibrating solutions too long, the profiles of the working surfaces degrade. Furthermore, the trial and error method is inefficient and not preferred, since the workpieces often remain in the vibrating tub after the desired surface roughness is obtained, or the surface has become isotropic. Time, resources and expense are wasted when the vibratory finishing process continues beyond the time necessary to achieve the desired surface roughness or isotropic surfaces.

The systematical fundamentals of vibratory finishing have not been established prior to the present invention. A universal method for vibratory finishing that produces a desired surface roughness or an isotropic surface on an exterior surface of a workpiece without degrading the profile has not been determined. Furthermore, no common procedures exist to evaluate the vibratory finishing system, including the process set-up conditions, equipment, media, solution, etc. To apply the vibratory finishing technology to the final finishing process for workpieces such as specialty products, it is necessary to develop a process based upon control of process parameters, such as surface roughness and stock removal.

The present invention resides in an improved process founded upon formulas and mathematical modeling for a vibratory finishing process that provides for determination of process parameters, such as an optimum processing time to achieve a desired or aimed surface roughness based upon an initial surface roughness of a workpiece. Based upon the process parameters, superior exterior surfaces for the workpiece are provided in a minimum processing time. The validity of the modeling is illustrated by comparison to experimental results. The invention also resides in workpiece surfaces having a desired or aimed surface roughness after being exposed to the vibratory finishing process for a predetermined optimum processing time.

BRIEF DESCRIPTION OF THE DRAWINGS

The objects of the invention are achieved as set forth in the illustrative embodiments shown in the drawings which form a part of the specification.

FIG. 1C is FIGS. 1A and 1B after being subjected to vibratory finishing processes for 45 minutes, and having a surface roughness of 0.06 μmRa and an isotropic surface;

FIG. 1D a highly magnified photographic representation of the surface shown in FIGS. 1A–1C after being subjected to vibratory finishing processes for 180 minutes, and having a surface roughness of 0.06 μmRa and an isotropic surface;

Corresponding reference characters indicate corresponding parts throughout the several views of the drawings.

TABLE OF ABBREVIATIONS

Figure 1A:
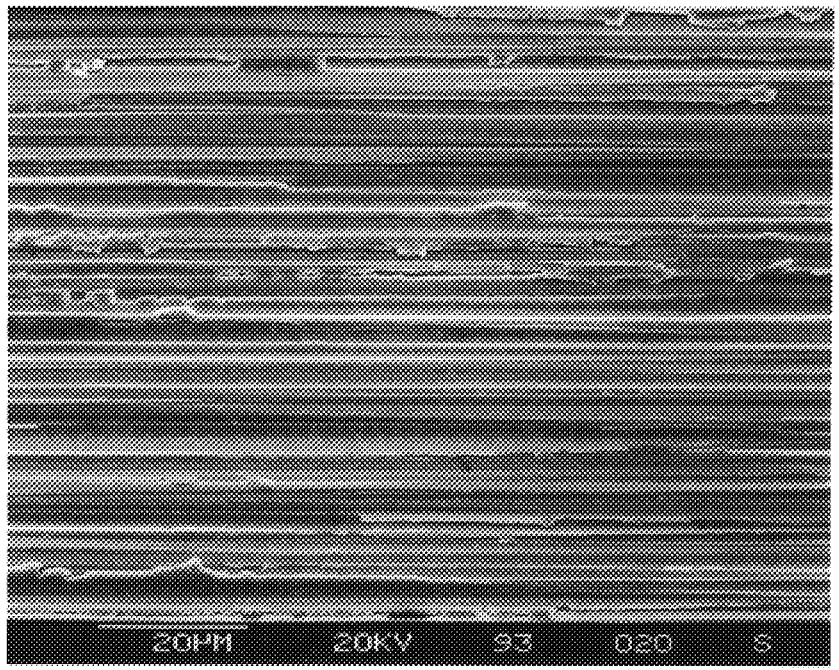
FIG. 1A is a highly magnified photographic representation of a surface with a traditional enhanced finish illustrating directional markings, and having an initial surface roughness Ir of 0.28 μmRa.

A: constant
C1: constant
Ar: aimed average roughness in Ra
Dr: roughness limitation in Ra
Ir: initial roughness in Ra
m: constant stock removal rate in diameter of a cylindrical workpiece
m': constant stock removal rate in radius of a cylindrical workpiece or thickness from the exterior surface of a noncylindrical workpiece
Ra: arithmetic average roughness
Ra(t): average roughness function in Ra
ΔRa(t): average roughness change in Ra
Rt(t): maximum roughness height in Rt
ΔRt(r): maximum roughness height change in Rt
S(t): stock removal function
Sm(t): stock removed in steady state process
Sr(t): stock removal due to surface roughness change
t: finishing process time
T: time constant of vibratory finishing system
$T_{opt}$: optimum process time to achieve the desired or aimed average roughness Ar

DESCRIPTION OF THE PREFERRED EMBODIMENT

The present invention relates to a vibratory finishing process for providing a superior finish having a desired surface roughness on exterior or working surfaces associated with any workpiece within a minimum processing time. Algorithms and formulas set forth below are used to establish the processing time prior to commencing the vibratory finishing process. The vibratory finishing process as used throughout this disclosure includes conventional surface finishing processes such as barrelling, tumbling, rotating, agitating, spinning, shaking or centrifugal processes. The invention resides in the ability to control the vibratory finishing process based upon known parameters such that the desired surface roughness is obtained in an optimum processing time, thereby improving the overall efficiency of the process.

The workpiece preferably is constructed from a hard solid material (e.g., a steel or ceramic material). The size and the shape of the workpiece can vary greatly, depending upon the nature and use of the workpiece. For example, the workpiece can be a specialty product or machine part, such as a bearing or gear. In general, the workpiece of the present invention has at least one exterior surface finished using the process set forth below. The vibratory finishing process can be used to obtain a desired surface roughness, reduce or eliminate directional markings, and provide an improved surface appearance. One situation where this invention finds application is in processing a workpiece having at least two working surfaces that interact upon operation of the workpiece such that the working surfaces are maintained in contact or movable engagement during operation of the device (e.g., bearings or gears). Other workpieces can include, for example, a golf club shaft or head, a scissor or knife blade, a screw shaft, a hammer head, metal rings, a wrench and other hardened steel parts.

As discussed in greater detail below, the vibratory finishing process of the present invention provides that the working surfaces of the workpiece have a desired or aimed surface roughness. The process also provides that exterior surfaces can have an isotropic finish, if desired, and that profiles of the workpieces are not diminished or degraded as a result of the vibratory finishing procedures. The process is based upon rules, formulas, and algorithms set forth below.

The workpiece of the present invention can be constructed using any manufacturing processes to obtain the desired shape and dimensions of the finished product. As is known in the art, workpieces such as machine parts and specialty products are manufactured using traditional machining operations, such as grinding or hard turning, that leave the surfaces of the products with machining marks or surface irregularities having substantially directional orientation. As discussed in U.S. Pat. No. 5,503,481, the disclosure of which is incorporated herein by reference, at the conclusion of the last grind on such a surface, the directional surfaces typically have a roughness of about 10 to 30 μinRa (0.25 to 0.76 μmRa), where Ra stands for arithmetic average roughness as defined by the International Organization for Standardization (ISO), μin stands for microinch (one-millionth of an inch), and μm stands for micrometer (one-millionth of a meter) (see, col. 4, lines 22–40). A product with enhanced finishing has further refined surfaces as a result of additional grinding and honing or superfinishing procedures which do not degrade the profile imparted by the initial grind. Such enhanced finishing yields surface irregularities on the order of 1 to 5 $\mu$inRa (0.025 $\mu$mRa to 0.13 $\mu$mRa).

The process of the present invention relies on conventional manufacturing processes to bring the exterior surface of the product or machine component to the proper profile with an arithmetic average roughness (Ra) of typically 10 to 20 $\mu$in (0.25 to 0.51 $\mu$m), and usually no more than approximately 30 $\mu$in (0.76 $\mu$m). To reduce the initial surface roughness to a desired surface roughness, the product is subjected to the vibratory finishing process for a predetermined minimum processing time. If elimination of directional irregularities or machine markings on the exterior surfaces is desired, the desired roughness and processing time are calculated such that the vibratory finishing process eradicates some irregularities and renders the remaining irregularities nothing more than shallow pits having no particular orientation such that the exterior surfaces are isotropic.

The vibratory finishing process of the present invention takes place in a container, bowl, tub or other similar receptacle containing one or more workpieces and an abrasive media or a plurality of abrading elements (e.g., small triangular blocks). As the tub is vibrated, the abrading elements or media come into contact with exterior surfaces of the workpieces, thereby effectively displacing portions of the workpiece material from the exterior surface. As is known in the art, the process of removing portions of the material from the exterior surface is referred to as stock removal. The abrading elements scour away elevated regions of the surfaces, while the depressed regions remain in tact, thus effectively obliterating the depressed regions. The extent to which the depressed regions are eliminated is based upon the duration of time that the workpieces remains in the vibrating tub.

The vibratory finishing process of the present invention does not require any particular solution or chemical to be included in the tub to obtain the desired surface roughness. The finishing process of the present invention can be performed in a dry container (no coolant added), or can include any appropriate solution such as water, an alkaline solution, an acid solution or a liquid chemical solution.

The agitation of the component and abrading elements within the tub continues until the exterior surface achieves the desired surface roughness. If desired, this process can continue until the exterior surface becomes an isotropic surface. As discussed in the BACKGROUND OF THE INVENTION section, prior to this invention, an optimum process time $T_{opt}$ necessary for agitation of the component was not known, and a trial and error approach was used to determine when the vibratory finishing process was completed and the surfaces achieved the aimed surface roughness or became isotropic. As discussed above, the trial and error method is inefficient and not preferred, since the workpieces often remain in the vibrating tub after the desired surface roughness is obtained or the surface has become isotropic. Time, resources and expense are wasted when the vibratory finishing process continues beyond the time necessary to achieve the desired surface roughness or the isotropic surface. Therefore, as set forth below in greater detail, the vibratory finishing process of the present invention provides a method for determining the optimum process time $T_{opt}$ representative of the processing time necessary to obtain a desired surface roughness based upon an initial surface roughness (Ir), a desired or aimed surface roughness for the exterior surface (Ar), a time constant of the vibratory finishing process (T), and a minimum average surface roughness for the exterior surface obtainable using the vibratory finishing process (Dr). The process of the present invention maximizes time and resources, and guarantees the profiles created by the initial manufacturing procedures remain unchanged. The process also can be used to obtain an isotropic surface for the workpiece.

Figure 1B:
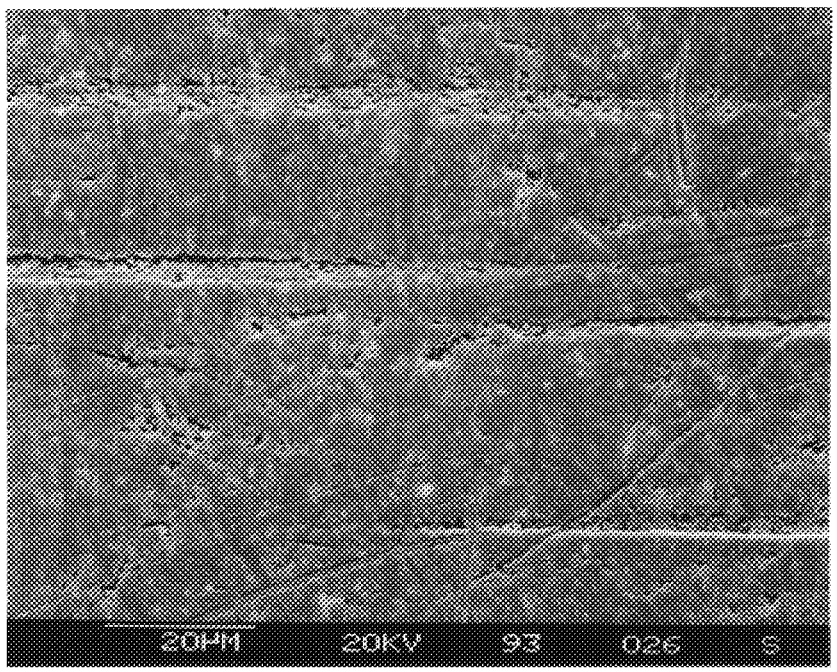
FIG. 1B is a highly magnified photographic representation of the surface shown in FIG. 1A after being subjected to vibratory finishing processes for 30 minutes, and having a surface roughness of approximately 0.06 μmRa and a nonisotropic surface.

To understand the characteristics of the vibratory finishing process, the results of several experimental tests are provided. In these tests, media circular flow type tumbling machines were employed. Various kinds of abrading media were placed inside the tumbling machines, along with cylindrical specimens, having diameters within the range of 6 mm to 250 mm and constructed from hardened steel with a hardness of 62 HRC. FIGS. 1B–1D illustrate scanning electron microscope (SEM) pictures of a specimen surface, taken before and during the vibratory finishing process at various process times t. FIG. 1A is a highly magnified photographic representation of the surface with an enhanced finish prior to exposure to the vibratory finishing process (t=0), illustrating grinding grooves with directional orientation, and having an initial surface roughness Ir of 0.28 $\mu$mRa (11 $\mu$inRa). The grooves were eliminated gradually from the surface to a surface roughness of 0.06 $\mu$mRa (2.5 $\mu$inRa) after 30 minutes of exposure to the vibratory finishing process (FIG. 1B). After 45 minutes of operation, the directional grooves disappeared completely from the surface (FIG. 1C). As shown in FIG. 1C, the resulting finished surface had a roughness of 0.06 $\mu$mRa (2.5 $\mu$inRa) and an inherent surface texture indicative of vibratory finishing, with no directional machining marks. FIG. 1D shows the surface after being subjected to the vibratory finishing process for a process time t of 180 minutes.

It is important to note in FIGS. 1C and 1D that the exterior surface of the workpiece had an isotropic finish after a processing time of 45 minutes, and the surface roughness remained substantially unchanged. This test result illustrates an important characteristic of the vibratory finishing process, namely that the finishing surface of components treated by the vibratory finishing process has an inherent surface texture with a constant surface roughness which is obtained after exposure to the vibratory finishing process for a period of time. The constant surface roughness of the inherent surface texture is referred to as roughness limitation Dr. In the example shown in FIGS. 1A–1D, the roughness limitation Dr is 0.06 $\mu$mRa (2.5 $\mu$inRa). When the finished surface reaches the inherent surface texture having an isotropic finish, the texture as well as the roughness remain unchanged for throughout the remainder of the vibratory finishing process. The roughness limitation Dr represents a minimum average surface roughness obtainable using the vibratory finishing process. Therefore, after a process time t of 45 minutes, the inherent surface texture is obtained and the vibratory finishing operation should be stopped to save time and reduce cost. Stopping the procedure at this time also reduces the risk of degrading the profiles of the parts. If an isotropic surface texture is not required, the vibratory finishing process can be stopped after a processing time t when the surface roughness reaches a desired roughness (Ar) which can be determined using the formulas set forth below.

Figure 2:
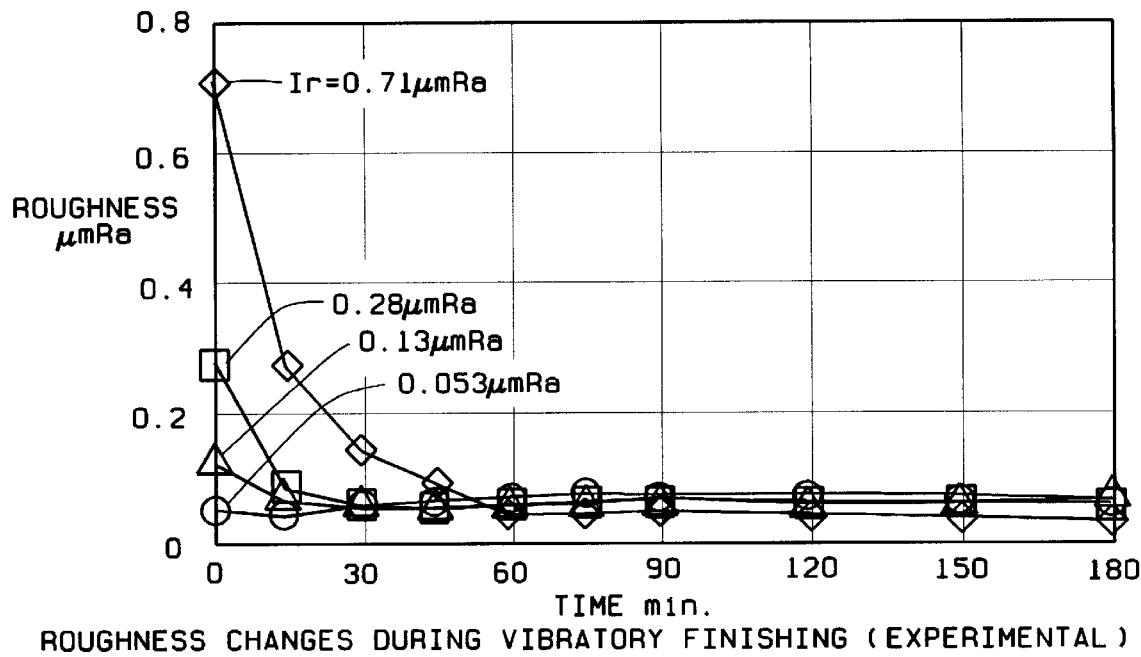
FIG. 2 is a graph comparing measured surface roughness changes of four workpieces having differing initial roughnesses during the initial hours of the vibratory finishing process.

FIG. 2 is a graph illustrating changes in surface roughness Ra of four specimens or workpieces at various processing times t during the vibratory finishing process, with each workpiece having a different initial roughness Ir. This graph illustrates the roughness limitation Dr in the vibratory finishing system which has a value of approximately 0.064 μmRa (2.5 μinRa). In those workpieces having a high initial roughness Ir, the roughness was rapidly reduced at a higher rate of change than that experienced by the workpieces having a lower initial roughness. The rate of change for those workpieces having a high initial roughness Ir was gradually reduced as the surface roughness Ra approached the roughness limitation Dr. Thus, it can be stated that the rate of roughness change is proportional to the difference between the roughness Ra(t) of finished surface and the roughness limitation Dr. As the difference between Ra(t) and Dr increases, the rate of roughness change also increases.

Figure 3:
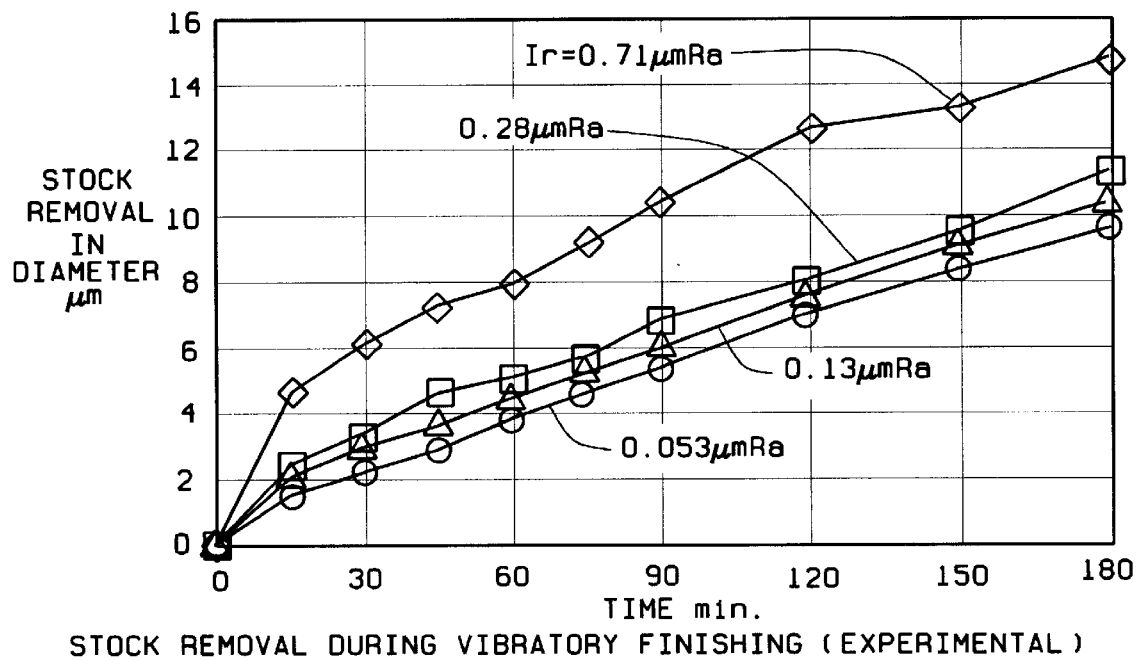
FIG. 3 is a graph comparing measured stock removal for four workpieces having differing initial roughnesses during the initial hours of the vibratory finishing process.

FIG. 3 is a graph showing measured stock removal for the four workpiece specimens referenced in FIG. 2 at various process times t during the initial hours of the vibratory finishing process. The stock removal measurements were determined based upon changes in the workpiece diameter at the various process times t. The stock removal pattern consists of transient and steady state periods, where the transient period represents the time interval during which the surface roughness is changed from the initial roughness Ir to the roughness limitation Dr, and the steady state period refers to the time interval after the roughness limitation Dr is obtained. During the transient period, the stock removal rate is variable based upon the difference between Ra(t) and Dr, and then the stock removal rate is constant during the steady state period. Furthermore, the stock removal rate during the transient period increases as the initial roughness Ir of the specimens increases. For example, as shown in FIG. 3, the stock removal rate for the specimen having an initial roughness Ir of 0.71 μmRa is greater than that for the other specimens during the transient period. In other words, the transient stock removal rate depends upon the initial roughness Ir. However, the vibratory finishing process has a constant stock removal rate m during the steady state period, regardless of the initial roughness Ir.

Based on the conclusions reached above, namely, that the surface of a workpiece treated by the vibratory finishing process has an inherent surface texture with a constant roughness limitation Dr and that the rate of roughness change increases as the difference between Ra(t) and Dr increases, it can be stated that the rate of roughness change dRa(t)/dt is proportional to the roughness difference between the surface roughness at process time t, referred to as Ra(t), and the roughness limitation Dr. This conclusion can be described by the following differential equation:

$$\frac{dRa(t)}{dt} = A[Ra(t) - Dr] \tag{1}$$

where A is a constant. Solving for the average roughness function Ra(t) from Eq. (1) gives the following results:

$$Ra(t) = C1 \cdot e^{At} + Dr \tag{2}$$

where C1 is a constant. Since Ra(0)=Ir at t=0 and Ra(∞)=Dr at t=∞, the constant C1 and A are obtained from Eq. (2) as follows:

$$C1 = (Ir - Dr) \tag{3}$$

$$A < 0 \tag{4}$$

In Eq. (1), the constant A represents the rate of roughness change but has the unit of inverse of time. Thus, it is more convenient and realistic to represent the constant A by the following equation:

$$A = -\frac{1}{T} \tag{5}$$

where T is defined as the time constant of the vibratory finishing system and represents the degree of the response time of the system. As is known in the art, tests are performed to determine the time constant T. The time constant T is determined based upon factors such as the vibrating frequency, the workpiece material, the time of tumbling machine, the type of abrading media, whether any solution is included in the tub, temperatures, size and shape of the workpiece, and other factors. Now, substituting Eq. (3) and Eq. (5) into Eq. (2), the average roughness function Ra(t) during vibratory finishing operation is set forth in the following equation:

$$Ra(t) = (Ir - Dr) \cdot e^{-\frac{t}{T}} + Dr \tag{6}$$

Therefore, the roughness of finishing components is predicted by Eq. (6) based upon known system parameters (time constant T and roughness limitation Dr), if the initial roughness Ir is measured before the vibratory finishing process begins. The time constant T can be measured by the process time t when the surface roughness becomes the value of Ra(T) given by the following equation:

$$Ra(T) = (Ir - Dr) \cdot e^{-1} + Dr \tag{7}$$

Two types of stock removal mechanisms are employed in the vibratory finishing process. One type is based on a micro-cutting action of the abrading elements against the exterior surface during the entire vibratory finishing process (transient and steady state). As discussed above, the stock removal rate m during the steady state period is constant. The stock removal resulting from this micro-cutting action during the steady state period is represented by Sm(t). The other type of stock removal mechanism is based upon the change of roughness set forth in by Eq. (6) during the transient period. The change of the surface roughness and the micro-cutting action result in a stock removal during the transient period that is represented by Sr(t). Therefore, a total stock removal S(t) of the vibratory finishing process is described as:

$$S(t) = Sm(t) + Sr(t) \tag{8}$$

The constant stock removal rate m during the steady state process associated with vibratory finishing is defined as:

$$\frac{dSm(t)}{dt} = m \tag{9}$$

Solving for Sm(t) from Eq. (9) by using Sm(0)=0 at t=0 gives $$Sm(t) = m \cdot t \tag{10}$$

where m is the constant stock removal per unit process time.

While the surface roughness Ra(t) changes until the roughness reaches the roughness limitation Dr, the transient stock removal Sr(t) is approximately equal to the change of a maximum peak-to-valley height Rt on the surface profile to be finished. The maximum roughness height Rt can be approximated as Rt≈4·Ra. So, the stock removal Sr(t) in the diameter of a workpiece is:

$$Sr(t) = 2 \cdot \Delta Rt \approx 2(4 \cdot \Delta Ra) \tag{11}$$

where ΔRt and ΔRa represent the change in maximum roughness height and change in average roughness, respectively. From Eq. (6), the change of average roughness ΔRa(t) is.

$$\Delta Ra(t) = Ra(0) - Ra(t) = (Ir - Dr)(1 - e^{-\frac{t}{T}}) \quad (12)$$

Substituting Eq. (12) into Eq. (11) gives the following results:

$$Sr(t) = 2 \times 4(Ir - Dr)(1 - e^{-\frac{t}{T}}) \quad (13)$$

Also, substituting Eq. (10) and Eq. (13) into Eq. (8), the total stock removal S(t) in diameter is described as follows:

$$S(t) = (m \cdot t) + (2 \times 4(Ir - Dr)(1 - e^{-\frac{t}{T}})) \quad (14)$$

The total stock removal for a noncylindrical specimen can be easily determined based upon the foregoing theoretical analysis based upon thickness from the exterior surface of the workpiece (instead of the diameter of the workpiece). In this situation, the total stock removal in face thickness for noncylindrical workpieces is:

$$S(t) = (m' \cdot t) + 4(Ir - Dr)(1 - e^{-\frac{t}{T}}) \quad (14')$$

where m' represents the stock removal rate in the thickness from the exterior surface of a noncylindrical workpiece. Eq. (14') also represents the total stock removal in radius for cylindrical workpieces. In this situation, m' represents the stock removal rate in radius of a cylindrical workpiece.

The vibratory finishing process of the present invention provides that the surface of a workpiece obtains a desired or aimed roughness Ar in a minimum process time t for a minimum cost. If an isotropic surface is desired, the desired surface roughness Ar is set at a value close to that of the roughness limitation Dr. The vibratory finishing process should be stopped when the surface roughness reaches the aimed roughness Ar to avoid profile degradation. The process time t corresponding to the time necessary to achieve the aimed roughness is referred to as the optimum process time $T_{opt}$.

To determine the optimum process time $T_{opt}$, substitute Ra(t)=Ar and t=$T_{opt}$ into Eq. (6) to obtain the following:

$$Ar = (Ir - Dr)(1 - e^{-\frac{Topt}{T}}) + 1Dr \quad (15)$$

Solving for $T_{opt}$ from Eq. (21) gives:

$$T_{opt} = -T \cdot \log e \frac{(Ar - Dr)}{(Ir - Dr)} \quad (16)$$

where $T_{opt}$>0. Eq. (16) reveals the minimum time of the vibratory finishing process to achieve the aimed roughness with the minimum cost.

The system parameters such as the time constant T, the roughness limitation Dr and the constant stock removal rate m can be measured from the experimental results shown in FIGS. 2 and 3, and the system parameters measured are:

Time constant: T=15 minutes

Roughness limitation: Dr=0.064 μmRa=2.5 μinRa

Constant stock removal rate in diameter: m=0.05 μm/min=2.0 μin/min

Figure 4:
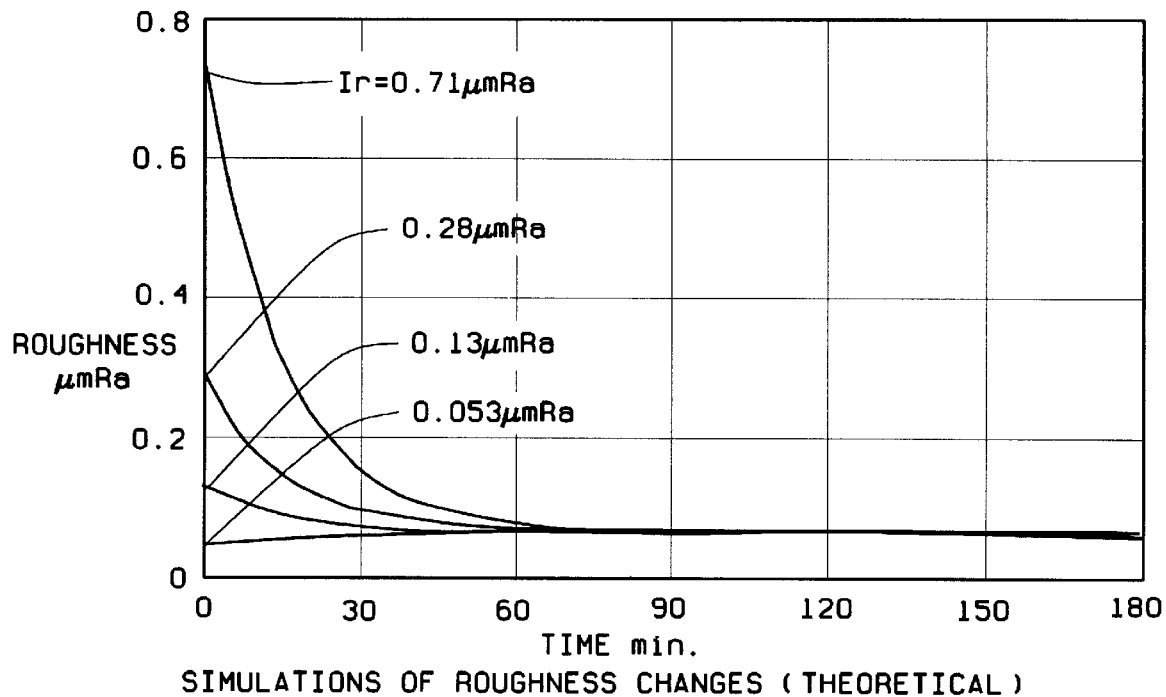
FIG. 4 is a graph comparing theoretical surface roughness changes of four workpieces having differing initial roughnesses during the initial hours of the vibratory finishing process.

FIG. 4 is a graph comparing theoretical surface roughness changes of four workpieces having initial roughnesses corresponding that of the four workpiece specimens shown in FIG. 2. These graphical results are based upon mathematical model simulations using Eq. (6) and the above system parameters. This theoretical model corresponds to the test results shown in FIG. 2. The results of theoretical simulations for roughness changes during the vibratory finishing process also accurately coincide with the experimental results.

Figure 5:
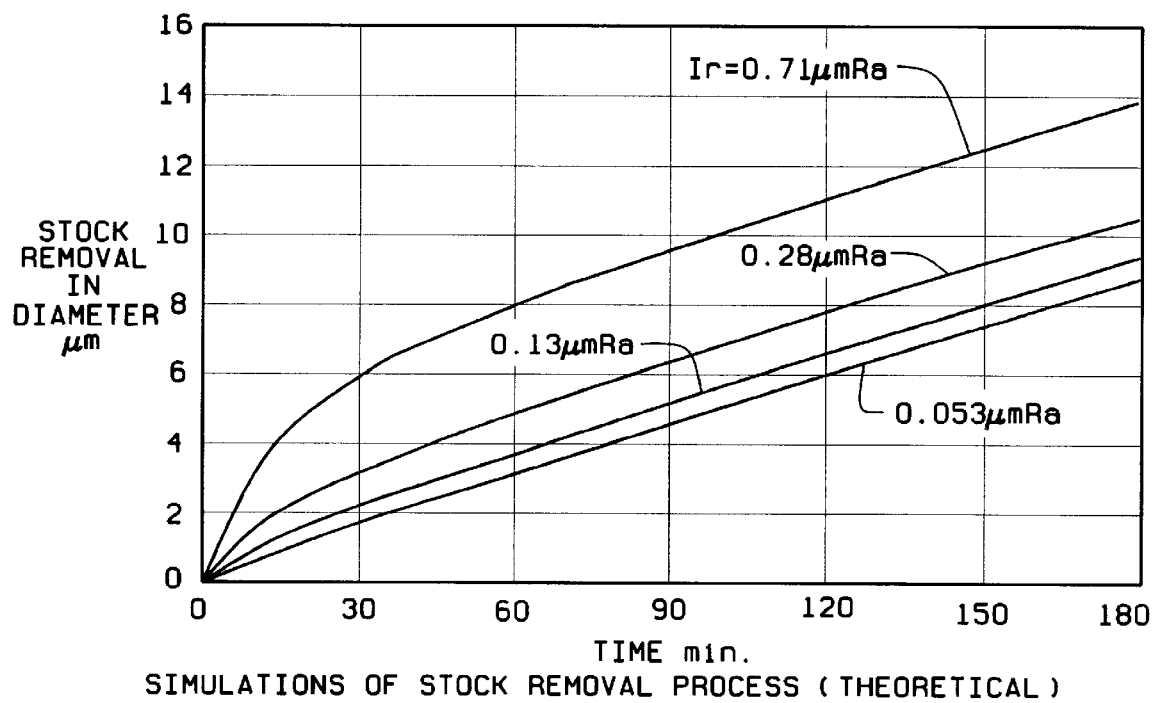
FIG. 5 is a graph comparing theoretical stock removal for four workpieces having differing initial roughnesses during the initial hours of the vibratory finishing process.

FIG. 5 is a graph comparing theoretical stock removal for the four workpieces shown in FIG. 4 during the initial hours of the vibratory finishing process. This graph shows the theoretical results of simulations using Eq. (14) and the above system parameters. The theoretical results clearly agree with the experimental stock removal test results shown in FIG. 3.

Figure 6:
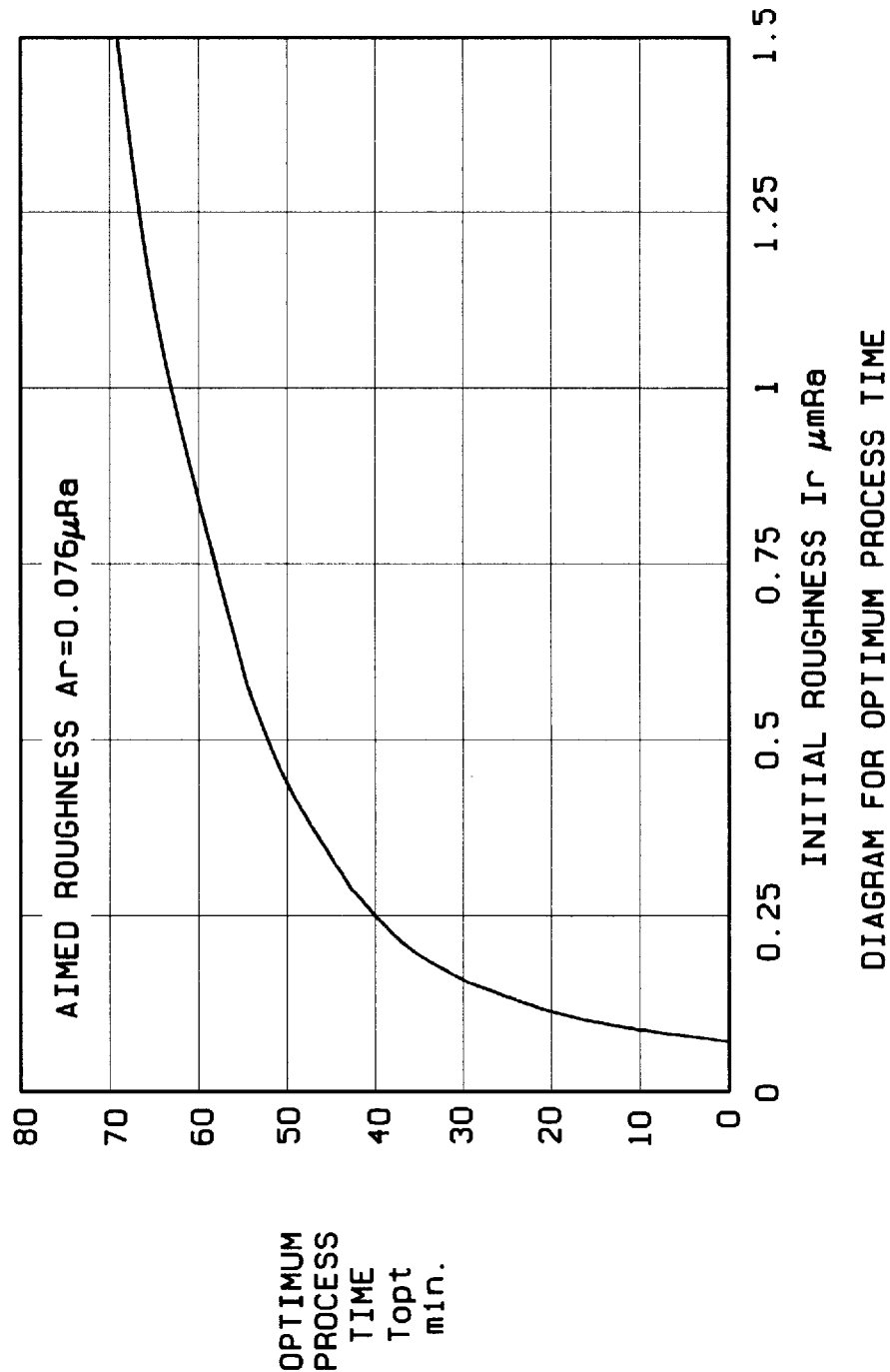
FIG. 6 is a graph illustrating the optimum processing time to obtain a predetermined aimed roughness Ar of 0.076 μmRa for a workpiece having an initial roughness Ir within the range of 0 to 1.5 μmRa.

FIG. 6 is a graph illustrating the optimum processing time $T_{opt}$ to obtain a predetermined desired or aimed roughness Ar for a workpiece having an initial roughness Ir within the range of 0 to 1.5 μmRa. In this example, Eq. (16) is used to generate the plotted curve representative of the optimum processing time $T_{opt}$, with the aimed roughness Ar being 0.076 μmRa (3.0 μinRa). When the initial roughness Ir of incoming workpieces is 0.28 μmRa, the optimum processing time $T_{opt}$ is 43 minutes. Using the optimum processing time $T_{opt}$ of 43 minutes, the final roughness Ar is calculated to be 0.076 μmRa (3.0 μinRa) using Eq. (15), and total stock removal S(t) as calculated using Eq. (14) is 3.8 μm in diameter. In this situation, the surface finish is isotropic since the aimed surface roughness Ar is set to a value close to the roughness limitation Dr (i.e., Ar=3.0 μinRa and Dr=2.5 μinRa). If Ar is set to a value much greater than that of Dr (e.g., Ar=6 μinRa), the surface finish is not isotropic.

The analysis set forth above not only allows for accurate prediction of the vibratory finishing process parameters such as surface roughness and stock removal, but also mathematically describes the characteristics of the vibratory finishing process summarized as basic rules. Furthermore, the optimum finishing process is defined in terms of minimum process time and cost to achieve the aimed roughness Ar, and the formula to design the optimum process is established.

The foregoing description is set forth only for illustrative purposes only and is not meant to be limiting. Numerous variations, within the scope of the appended claims will be apparent to those skilled in the art in light of the foregoing description and accompanying drawings.

Having thus described the invention, what is claimed and desired to be secured by Letters Patent is:

1. In a workpiece having at least one exterior surface, the improvements comprising said exterior surface having a predefined desired average surface roughness (Ar) obtained by subjecting said exterior surface to a vibratory finishing process for a predetermined processing time ($T_{opt}$) defined as:

$$T_{opt} = -T \cdot \log e \frac{(Ar - Dr)}{(Ir - Dr)}$$

where T represents a time constant of the vibratory finishing system indicating the degree of response time of the system, Ir represents an initial average surface roughness of said exterior surface before exposure to the vibratory finishing process, and Dr represents a minimum average surface roughness for said exterior surface obtainable using the vibratory finishing process.

2. The workpiece as set forth in claim 1 wherein the workpiece is constructed from a steel material.

3. The workpiece as set forth in claim 1 wherein the initial roughness Ir of said exterior surface is derived by mechanical machining.

4. The workpiece as set forth in claim 1 wherein said exterior surface has a substantially cylindrical shape.

5. The workpiece as set forth in claim 4 wherein the diameter of said exterior surface effectively is reduced during the vibratory finishing process based upon a total stock removal S(t) defined as:

$$S(t)=(m\cdot t)+(2\times 4(Ir-Dr)(1-e^{-t/T}))$$

where m represents a constant stock removal rate in diameter after the minimum average surface roughness Dr is obtained, and t represents a processing time for the vibratory finishing process.

6. The workpiece as set forth in claim 4 wherein the radius of said exterior surface effectively is reduced during the vibratory finishing process based upon a total stock removal S(t) defined as:

$$S(t)=(m'\cdot t)+4(Ir-Dr)(1-e^{-t/T})$$

where m' represents a constant stock removal rate in the radius of said exterior surface after the minimum average surface roughness Dr is obtained, and t represents a processing time for the vibratory finishing process.

7. The workpiece as set forth in claim 1 wherein said exterior surface has a substantially noncylindrical shape.

8. The workpiece as set forth in claim 7 wherein the thickness of said exterior surface effectively is reduced during the vibratory finishing process based upon a total stock removal S(t) defined as:

$$S(t)=(m'\cdot t)+4(Ir-Dr)(1-e^{-t/T})$$

where m' represents a constant stock removal rate in the thickness from said exterior surface of the noncylindrical workpiece after the minimum average surface roughness Dr is obtained, and t represents a processing time for the vibratory finishing process.

9. The workpiece as set forth in claim 1 wherein an arithmetic average surface roughness for said exterior surface at any particular processing time t during the vibratory finishing process (Ra(t)) is defined as:

$$Ra(t)=(Ir-Dr)\cdot e^{-t/T}+Dr.$$

10. A workpiece, comprising:
   a first component having at least one working surface;
   a second component having at least one working surface, said working surface of said second component contacting the first component at the working surface during movement of said second component with respect to said first component;
   said working surfaces of said first component having a predefined desired average surface roughness ($Ar_1$) obtained by subjecting said first component to a conventional vibratory finishing process for a first predetermined processing time ($T_{opt1}$), and said second component having a predefined desired average surface roughness ($Ar_2$) obtained by subjecting said second component to the vibratory finishing process for a second predetermined processing time ($T_{opt2}$) wherein the predetermined processing time ($T_{opt1}$) for said first component is defined as:

$$T_{opt1}=-T_1\cdot\log e\frac{(Ar_1-Dr_1)}{(Ir_1-Dr_1)}$$

where $T_1$, represents a time constant of the vibratory finishing system indicating the degree of response time of the system, $Ir_1$, represents an initial average surface roughness of said first component, and $Dr_1$, represents a minimum average surface roughness for said first component obtainable using the vibratory finishing process.

11. The workpiece as set forth in claim 10 wherein the predetermined processing time ($T_{opt2}$) for said first component is defined as:

$$T_{opt2}=-T_2\cdot\log e\frac{(Ar_2-Dr_2)}{(Ir_2-Dr_2)}$$

where $T_2$, represents a time constant of the vibratory finishing system indicating the degree of response time of the system, $Ir_2$ represents an initial average surface roughness of said second component, and $Dr_2$ represents a minimum average surface roughness for said second component obtainable using the vibratory finishing process.

12. The workpiece as set forth in claim 10 wherein the workpiece is constructed from a steel material.

13. The workpiece as set forth in claim 10 wherein the profiles for the working surfaces of said first and second components are derived by mechanical machining.

14. The workpiece as set forth in claim 10 wherein said first component has a substantially cylindrical shape.

15. The workpiece as set forth in claim 14 wherein the diameter of said first component effectively is reduced during the vibratory finishing process based upon a total stock removal S(t) defined as:

$$S(t)=(m\cdot t)+(2\times 4(Ir_1-Dr)(1-e^{-t/T}))$$

where m represents a constant stock removal rate in diameter after the minimum average surface roughness Dr is obtained, and t represents a processing time for the vibratory finishing process.

16. The workpiece as set forth in claim 10 wherein an arithmetic average surface roughness for said first component at any particular processing time t during the vibratory finishing process (Ra(t)) is defined as:

$$Ra(t)=(Ir_1-Dr_1)\cdot e^{-t/T}+Dr_1.$$

17. A steel workpiece, comprising: at least one exterior surface having an initial average surface roughness (Ir) and profiles derived by mechanical machining which leaves said exterior surface with irregularities having directional orientation; said exterior surface having a desired average surface roughness (Ar) obtained by for a predetermined period of time ($T_{opt}$) based upon the initial average surface roughness (Ir), the desired average surface roughness (Ar) and a minimum average surface roughness obtainable for the workpiece (Dr) wherein the predetermined period of time ($T_{opt}$) is:

$$T_{opt}=-T\cdot\log e\frac{(Ar-Dr)}{(Ir-Dr)}$$

where T represents a time constant of the vibratory finishing system indicating the degree of response time of the system.

18. A vibratory finishing process for producing a predefined desired average surface roughness (Ar) on an exterior surface of a workpiece in a minimum processing time ($T_{opt}$), comprising the steps of:
   mechanically machining the exterior surface of the workpiece, whereby the exterior surface has an initial average surface roughness (Ir);
   inserting the workpiece in a tub along with a plurality of abrading elements; and vibrating the tub for the predetermined time interval ($T_{opt}$) to obtain the desired average surface roughness (Ar) on the exterior surface of the workpiece by moving the abrading elements into contact with the exterior surface wherein the step of vibrating the tub for the predetermined time interval ($T_{opt}$) includes vibrating the tub for the time interval defined as:

$$T_{opt} = -T \cdot \log e \frac{(Ar - Dr)}{(Ir - Dr)}$$

where T represents a time constant of the vibratory finishing system indicating the degree of response time of the vibratory finishing process, and Dr represents a minimum average surface roughness obtainable for the exterior surface.

19. The vibratory finishing process as set forth in claim 18 wherein said exterior surface has a substantially cylindrical shape.

20. The vibratory finishing process as set forth in claim 19 further including the step of effectively reducing the diameter of the exterior surface effectively as the tub is vibrated to obtain a total stock removal S(t) of:

$$S(t) = (m \cdot t) + (2 \times 4(Ir - Dr)(1 - e^{-t/T}))$$

where m represents a constant stock removal rate in diameter after the minimum average surface roughness Dr is obtained, and t represents a processing time for the vibratory finishing process.

* * * * *